(12) United States Patent
Jones et al.

(10) Patent No.: US 8,990,540 B2
(45) Date of Patent: Mar. 24, 2015

(54) INTEGRATED CIRCUIT SYSTEM PROVIDING ENHANCED COMMUNICATIONS BETWEEN INTEGRATED CIRCUIT DIES AND RELATED METHODS

(75) Inventors: Andrew Michael Jones, Redland (GB); Stuart Ryan, Bristol (GB)

(73) Assignee: STMicroelectronics (Research & Development) Limited, Marlow Bucks (GB)

(*) Notice: Subject to any disclaimer, the term of this patent is extended or adjusted under 35 U.S.C. 154(b) by 350 days.

(21) Appl. No.: 13/560,414

(22) Filed: Jul. 27, 2012

(65) Prior Publication Data

US 2013/0031330 A1   Jan. 31, 2013

(30) Foreign Application Priority Data

Jul. 28, 2011  (GB) .................................. 1112981.4

(51) Int. Cl.
G06F 12/10  (2006.01)
G06F 13/16  (2006.01)

(52) U.S. Cl.
CPC ................................. G06F 13/1657 (2013.01)
USPC ........................... 711/203; 711/108; 711/154

(58) Field of Classification Search
CPC .................................................. G06F 13/1657
USPC ......................................... 711/203, 108, 154
See application file for complete search history.

(56) References Cited

U.S. PATENT DOCUMENTS

| | | | |
|---|---|---|---|
| 6,226,710 B1 * | 5/2001 | Melchior ....................... | 711/108 |
| 6,307,855 B1 * | 10/2001 | Hariguchi ..................... | 370/392 |
| 7,343,469 B1 * | 3/2008 | Bogin et al. .................. | 711/209 |
| 7,516,119 B1 * | 4/2009 | Kao ................................ | 1/1 |
| 7,539,032 B2 * | 5/2009 | Ichiriu et al. .............. | 365/49.17 |
| 7,552,275 B1 * | 6/2009 | Krishnan ....................... | 711/108 |
| 7,613,876 B2 * | 11/2009 | Bruce et al. ................... | 711/113 |
| 7,634,500 B1 * | 12/2009 | Raj .................................... | 1/1 |
| 7,783,654 B1 * | 8/2010 | Sreenath ........................ | 707/758 |
| 7,908,431 B2 * | 3/2011 | Krishnan ....................... | 711/108 |
| 7,917,694 B1 * | 3/2011 | Venkatachary ................ | 711/113 |
| 8,549,218 B2 * | 10/2013 | Fusella et al. .................. | 711/108 |
| 8,782,367 B2 * | 7/2014 | Courcambeck et al. ...... | 711/163 |
| 2002/0027557 A1 | 3/2002 | Jeddeloh | |
| 2007/0106873 A1 | 5/2007 | Lally et al. | |
| 2013/0031347 A1 * | 1/2013 | Jones et al. ........................ | 713/2 |

OTHER PUBLICATIONS

Great Britain Search Report dated Nov. 18, 2011 from corresponding Great Britain Application No. 1112981.4, 1 page.

* cited by examiner

*Primary Examiner* — Stephen Elmore
(74) *Attorney, Agent, or Firm* — Allen, Dyer, Doppelt, Milbrath & Gilchrist, P.A.

(57) ABSTRACT

A method may include receiving, at a first integrated circuit die, a memory transaction having an address from a second integrated circuit die. The method may further include determining, at the first integrated circuit die and based on the address, if the transaction is for the first integrated circuit die and, if so, translating the address. If transaction is for a third integrated circuit die, the transaction may be transmitted, without modification to the address, to the third integrated circuit die. The translation may be based upon a first table with each entry including a first address and a second translated address corresponding to the first address, and a second table with each entry including a first address and an indication if the transaction is to be forwarded without modification to the address.

32 Claims, 5 Drawing Sheets

INTEGRATED CIRCUIT SYSTEM PROVIDING ENHANCED COMMUNICATIONS BETWEEN INTEGRATED CIRCUIT DIES AND RELATED METHODS

CROSS REFERENCE TO RELATED APPLICATIONS

This application claims the priority benefit of Great Britain patent application number 1112981.4, filed on Jul. 28, 2011, which is hereby incorporated by reference to the maximum extent allowable by law.

BACKGROUND

1. Technical Field

The present disclosure relates to an arrangement and method, for example but not exclusively for routing.

2. Discussion of the Related Art

It has been proposed to provide a system in package having two or more dies. The dies may be arranged to share a memory space. A number of different considerations may need to be taken into account such as, for example, compatible memory maps.

SUMMARY

According to a first aspect, there is provided a first arrangement comprising: a first interface configured to receive a memory transaction having an address from a second arrangement; a second interface; an address translator configured to determine based on said address if said transaction is for said first arrangement and if so to translate said address or if said transaction is for a third arrangement to forward said transaction without modification to said address to said second interface, said second interface being configured to transmit said transaction, without modification to said address, to said third arrangement.

According to another aspect, there is provided a method comprising: receiving at a first arrangement a memory transaction having an address from a second arrangement; determining based on said address if said transaction is for said first arrangement and if so translating said address or if said transaction is for a third arrangement transmitting said transaction, without modification to said address, to a third arrangement.

BRIEF DESCRIPTION OF THE DRAWINGS

For an understanding of some embodiments, reference will be made by way of example only to the accompanying Figures in which.

DETAILED DESCRIPTION

Figure 1:
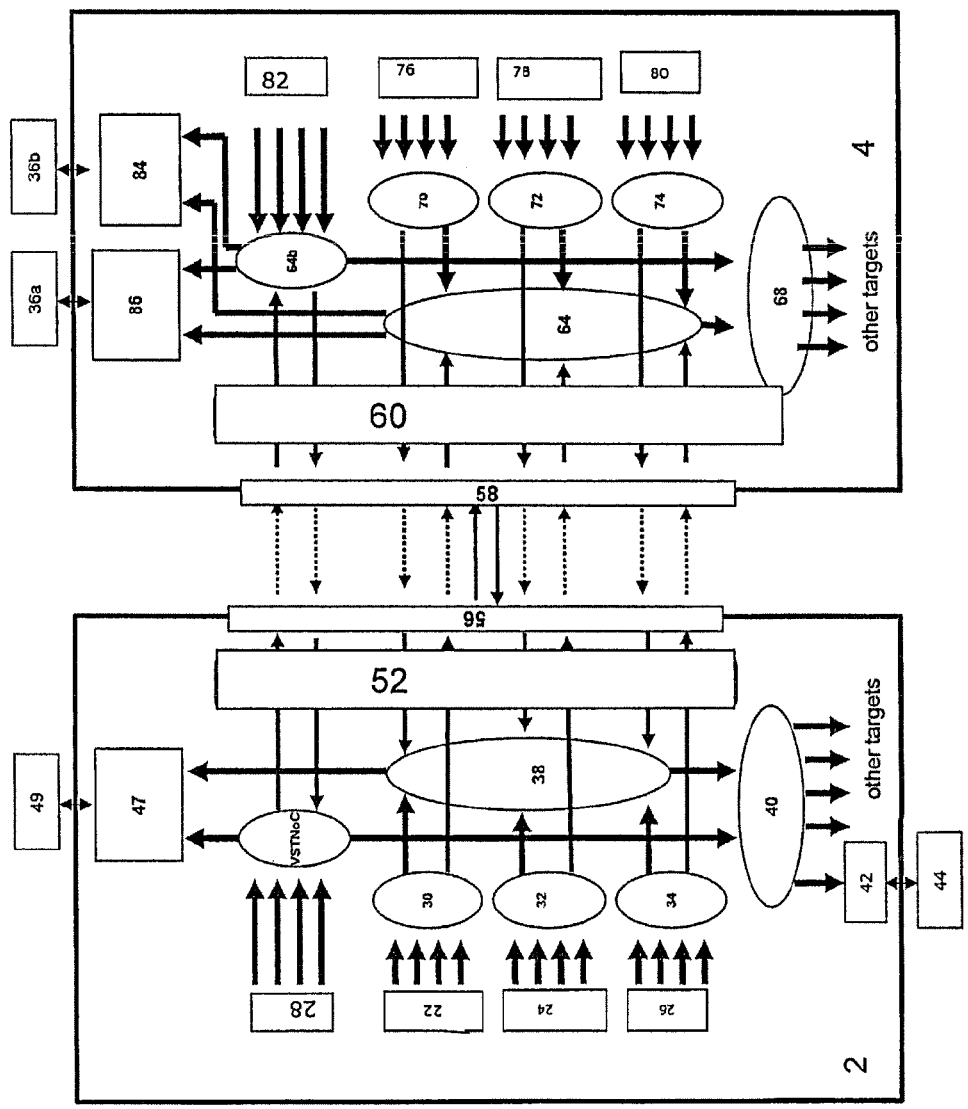
FIG. 1 schematically shows a package comprising a first die and a second die.

Some embodiments may be used where there are more than one die within a single package. In particular, a plurality of integrated circuit dies may be incorporated within a single package. In the following examples, FIG. 1 shows a single package having two dies which is provided to explain in detail the interaction between two dies. However it is appreciated that three or more dies may be provided in some embodiments in the same single package. This is explained in more detail with reference to FIG. 2.

The decreasing feature size in CMOS silicon processes allows digital logic to shrink significantly in successive fabrication technology. For example, an area reduction of 55% may be obtained when comparing a digital logic cell implemented in 90 nanometer technology with a digital logic cell implemented in 65 nanometer technology. However, analog and input/output cells tend to shrink much less if at all in these implementations. This may lead to increasingly pad limited designs in many complex system-on-chips (SoC). A pad limited design can be considered wasteful if the digital logic is not implemented as densely as it might be if it were the determining factor in the device area.

Another factor in some embodiments is that the transition, for example, to a sub 32 nanometer design may introduce a dichotomy between supporting low voltage, high speed input/output logic such as DDR3 (Double Data Rate) RAM (Random Access Memory) 1.5 V @800 MHz or higher on the one hand and higher voltage interconnect technologies, for example HDMI (High Definition Multimedia Interface), SATA (Serial Advanced Technology Attachment), USB3 (Universal Serial Bus), etc. The lower voltage DDR3 interface may require a lower transistor gate oxide thickness as compared to the HDMI technology. This may be incompatible within a standard process.

Porting of high speed analog interfaces to a new process consumes a lot of resources in terms of time and expert attention. By decoupling the implementation of analog blocks from that of digital blocks of the system may allow a reduction in time to working silicon.

By splitting a traditional monolithic system-on-chip into a plurality of dies in order to form a system in package comprising two or more dies, advantages can be achieved. For example, each die may be designed to provide a particular function which may require various different mixes of analog and digital circuitry in the implementation of the particular function. This means that in some embodiments, it may be possible to use the same die or same design for a die in different packages. This modularity may reduce design time.

Embodiments may be used where there are three or more dies in the package. Embodiments may be used where the dies are manufactured in different technologies. Embodiments may be used alternatively or additionally where it is advantageous for at least one of the dies to be certified, validated or tested independently for conformance to, for example, a standard. Embodiments may alternatively or additionally be used where one of the dies contains special purpose logic to drives specific wireless, optical or electrical interfaces so that the other die or dies can be manufactured independently and not incur any costs associated with the special purpose logic. Embodiments may alternatively or additionally be used where one of the dies contains information, for example encryption information, which is to be withheld from the designers/manufacturers of the other die or dies. Embodiments may alternatively or additionally be used where one of the dies contains high density RAM (Random Access Memory) or ROM (Read Only Memory) and it is preferable to separate this from standard high speed logic for reasons of fabrication yield and/or product flexibility.

It should be appreciated that some embodiments may have additional or alternative advantages other than those discussed previously.

Reference will now be made to FIG. 1 which shows an example of a system in where two dies are provided to illustrate one example of an interaction between two dies.

Some embodiments may be used where there are more than two dies within a single package. In particular, three or more integrated circuit dies may be incorporated within a single package.

Alternative embodiments may be used for communication between three different entities. Those entities may be integrated circuits or other types of circuits. These three or more entities may not be included in a single package but, for example, may be provided on a circuit board.

Usually, most of the communications between the dies will be read and write transactions to the memory address space of either chip. If 32 bits physical addressing is used, this may lead to a limitation of $2^{32}=4$ GBytes of addressable locations. In some embodiments, a single die can use up most of this addressable location leading to the consideration of how to integrate three dies when the aggregate address space exceeds 4 GBytes. Further, in order for the dies to communicate, they should have compatible physical addresses. This means that the addresses allocated to functional elements in one die, should not be allocated in the other die.

Reference is made to FIG. 1 which schematically shows a system in package 1 having a first die 2 and a second die 4.

The first die may be a set-top application specific die and the second die may be a media processing engine. These two dies may be used in a set-top box. The first die may have a lower density as compared to the second die and may contain most of the input/output and analog circuitry of the two dies. The second die contains most of the processing engines, memory and higher density logic.

It should be appreciated that the nature and function of the dies can cover a wide range of applications and is not limited to this one example.

By way of example, the first die 2 comprises a first initiator 22, a second initiator 24 and a third initiator 26. The first die 2 also comprises a CPU 28. In one embodiment, the initiators 22, 24 and 26 are configured to issue requests or transactions. By way of example only, these requests may comprise memory transactions for a memory 36a or 36b associated with the second die 4 or a memory 49 or 44 associated with the first die. Each of these initiators is configured to issue the requests to a respective bus node 30, 32 and 34. It should be appreciated that responses to the transactions will be forwarded from the bus node to the associated initiator.

Each of the bus nodes 30, 32 and 34 is configured to put the requests from the initiators onto a network-on-chip 38. The network-on-chip provides a communication path with a peripheral interconnect 40. The peripheral interconnect 40 has a communication path with, for example, an external memory interface 42. The external memory interface 42 may interface with externally provided memory such as flash memory 44. The peripheral interconnect 40 may, in some embodiments, also provide a communication path to one or more other targets.

The network-on-chip 38 also provides a communication path to a memory interface 47 which comprises a memory encryption system and a memory controller. The memory encryption system is a block of logic which is able to police accesses to DRAM and scramble the contents to thwart eavesdroppers. The memory controller is arranged to interface with external memory. That external memory may, for example, be a DDR (double data rate RAM random access memory). This is by way of example only and the memory interface may interface with any other suitable type of memory.

The CPU 28 is configured to interface with a CPU network-on-chip 50. The CPU network-on-chip 50 is configured to interface with the peripheral interconnect 40 and the memory interface 47.

The first die also has an address translation unit 52. The address translation unit 52 has a translation store. The address translation unit 52 will be described in more detail hereinafter.

A communication path is provided between the NoC 38 and the CPU NoC 50 and the address translation unit 52.

The first die has an interface 56 which is configured to transmit traffic to the second die and to receive traffic from the second die.

The second die 4 comprises an interface 58 which is configured to receive traffic from the first die 2 and to transmit traffic from the second die to the first die. The interface 58 is configured to communicate with an address translation unit 60 on the second die. Associated with the address translation unit 60 is a translation store.

The address translation unit 60 is configured to communicate with a first network-on-chip 64 and a CPU network-on-chip 66. The first network-on-chip 64 is configured to interface with a peripheral interconnect 68. The peripheral interconnect 68 is configured to interface with one or more targets. The first network-on-chip 64 is configured to interface with a first bus node 70, a second bus 72 and a third bus node 74. Each of the nodes is configured to interface with a respective initiator 76, 78 and 80.

The CPU network-on-chip 66 is configured to interface with a CPU 82.

The second die is also provided with a first memory interface 84 and a second memory interface 86. The first memory interface is configured to interface with the first memory 36a and the second memory interface is configured to interface with the second memory 36b.

It should be appreciated that FIG. 1 is a schematic view of the two dies. By way of example only, the initiators 22, 24 and 26 and/or the CPU 28 may require access to the memories 36a and 36b which are interfaced by the second die 4. Likewise, the CPU 82 and the initiators 76, 78 and 80 of the second die may require access to the memories interfaced by the first die 2, for example, the DDR 40 and/or the flash memory 44.

By way of example only, a request from the CPU 28 of the first die may be routed to the CPU network-on-chip 50 of the first die, then to the address translation unit and then to the first die interface 56. The first die interface 56 passes the request to the interface 58 of the second die. The request passes through the address translation unit to the CPU network-on-chip 66 of the second die. From the CPU network-on-chip, the request can be forwarded to the first memory interface 84, the second memory interface 86 and/or the peripheral interconnect 68.

For requests from the initiators 22, 24 and 26 of the first die, the routing is as follows: respective bus node to network-on-chip 38 to address translation unit 52 to interface 56 of the first die to interface 58 of the second die to address translation unit 60 to network-on-chip 64 and to one or more of the first memory interfaces 84, second memory interface 86 and peripheral interconnect 68.

It should be appreciated that responses to the respective requests will generally follow a reversed route back to the respective initiator or CPU.

For transactions issued by the CPU 82 or the initiators 76, 78 and 80 of the second die, the transactions generally follow the following path: to the CPU network-on-chip 66 in case of a transaction from the CPU and to the network-on-chip 64 from the respective bus node 70, 72 or 74 in the case of a transaction issued by one of the initiators. From the network-on-chip 66 or 64, the transaction is routed via the address translation unit 62 to the interface 58 of the second die. From the interface 58 of the second die, the transactions are routed to the interface 56 of the first die and via the address translation unit 52 to the respective network-on-chip 38 or 50. In particular, transactions from the CPU will be routed to the CPU network-on-chip and transactions from the initiators 76, 78 or 80 will be routed to the network-on-chip 38. The transactions will then be routed either to the memory interface 47 or to the peripheral interconnect 40 to allow access to for example the flash memory 44, other targets or the DDR 49. Again, the responses may be routed along a reverse path to the respective initiators.

It should be appreciated that the various initiators or CPUs may issue requests intended for memory space associated with the die which includes the respective initiators or CPUs.

Figure 2:
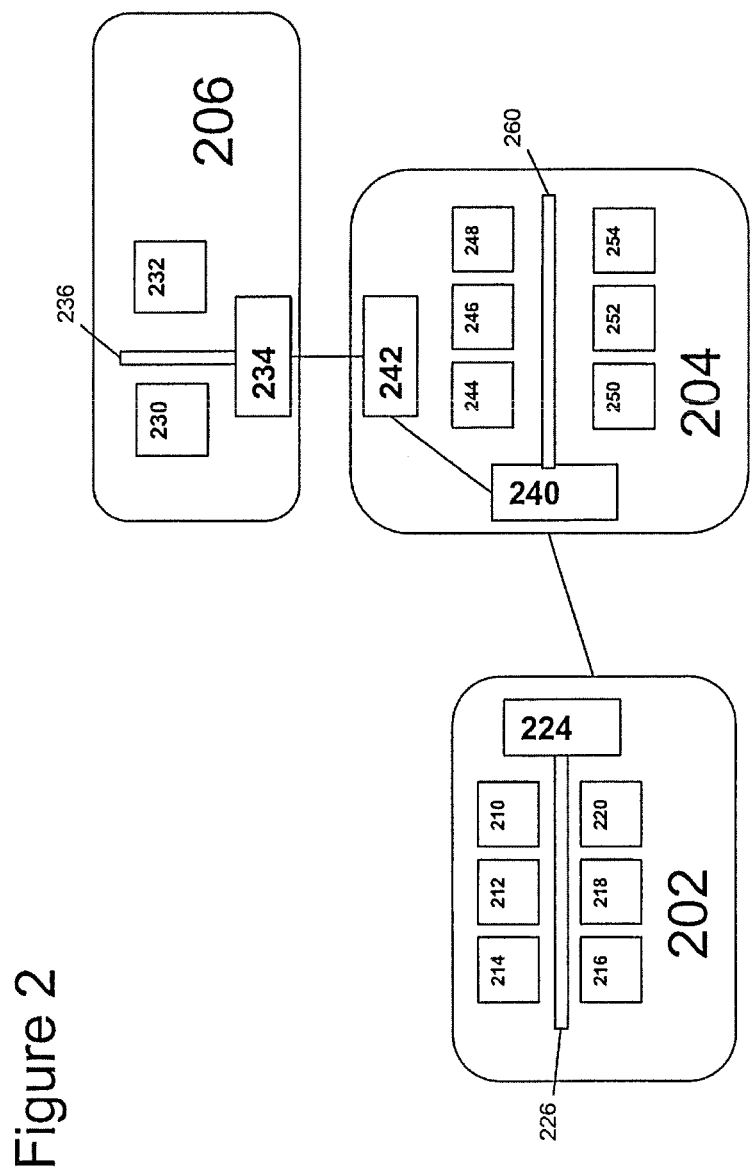
FIG. 2 schematically shows a package having three dies.

Reference is made to FIG. 2 which shows a simplified example where three dies are connected. It should be appreciated that the technique shown in FIG. 2 can be used where there are three or more dies. In the arrangement shown in FIG. 2, there is a first die 202, a second die 204 and a third die 206. It should be appreciated that any of the die shown in FIG. 2 may have generally the same structure as any of the die shown in more detail in FIG. 1.

Schematically, the first die 202 is shown as having blocks 210, 212, 214, 216, 218 and 220. These blocks may take any suitable form and may be a target, an initiator, a CPU and/or the like. It should be appreciated that the nature of the blocks, as well as the number of blocks, is by way of example only. In the arrangement shown in FIG. 2, a network-on-chip 226 is shown as providing communication between each of the blocks and an interfacing arrangement 224. The interfacing arrangement 224 comprises an interface such as shown in FIG. 1 and a corresponding address translation unit.

The second die 204 likewise is shown with blocks 244, 246, 248, 250, 252 and 254. Again, these blocks may take any suitable form and may be a target, an initiator, a CPU and/or the like. It should be appreciated that the nature of the blocks, as well as the number of blocks, is by way of example only. A network-on-chip 260 is shown as providing communication between each of the blocks and a first interfacing arrangement 240 of the second die. The first interfacing arrangement comprises an interface and an address translation unit. The first interfacing arrangement 240 is arranged to send communications/data to the interfacing arrangement 224 of the first die 202 and receive communications/data from the interfacing arrangement 224 of the first die 202. The first interfacing arrangement 240 of the second die and the interfacing arrangement 224 of the first die may be coupled via a link.

The second die has a second interfacing arrangement 242 which has a communication path or link with the first interfacing arrangement 240. The second interfacing arrangement has an interface and an address translation unit. In some embodiments, the second interfacing arrangement may be coupled to components of the second die only via the first interfacing arrangement of the second die. However, it should be appreciated that in some embodiments, the network-on-chip may additionally or alternatively be coupled to the second interfacing arrangement 242, directly or at least not only via the first interface.

The second interfacing arrangement 242 of the second die is arranged to send communications/data to an interfacing arrangement 234 of the third die 206 and receive communications/data from the interfacing arrangement 234 of the third die 206. The second interfacing arrangement 242 of the second die and the interface arrangement 234 of the third die may be coupled via a link. The interfacing arrangement comprises an interface and an address translation unit.

Schematically, the third die 206 is shown as having blocks 230 and 232. These blocks again may take any suitable form and may be a target, an initiator, a CPU and/or the like. It should be appreciated that the nature of the blocks, as well as the number of blocks, is by way of example only. In the arrangement shown in FIG. 2, a network-on-chip 236 is shown as providing communication between each of the blocks and the interfacing arrangement 234.

Embodiments may permit the first die 202 to communicate with the third die 206 via the second die 204.

In some embodiments, the second die may be configured so that it is not necessarily for the second die to be able to access or map the same resources of the third die. This may be for reasons of security and/or robustness. In some embodiments, the traffic which is routed from the first die to the third die via the second die is arranged so that it does not affect the function of the second die.

In some embodiments, there may be a finite resource for the translation in the second die. For example, this finite resource may be a number of translation store entries.

In some embodiments, a dedicated link may be provided between the two interfacing arrangements of the second die. The dedicated link may have any suitable format and may, for example, be a bus interface or a network-on-chip interface.

In embodiments, a request which requires through routing (that is routing a request from a first die through to a third die) is recognized by the respective interfacing arrangement and may thus require fewer translation store resources than a full translation. This may mean that in some embodiments a reduced through routing table can be used to effect the routing.

Figure 5:
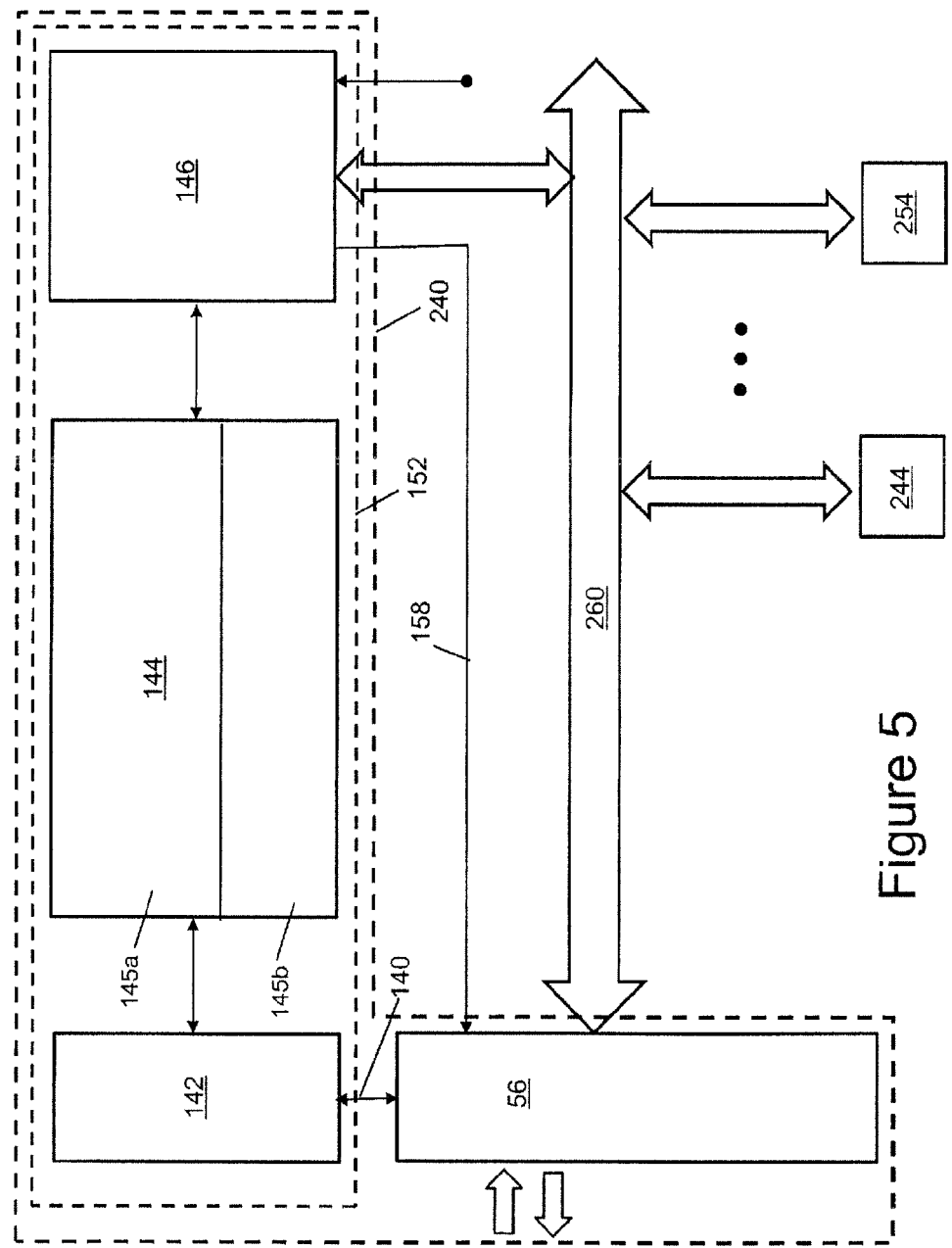
FIG. 5 shows an interfacing arrangement of the second die in more detail.

Reference is now made to FIG. 5 which shows the first interfacing arrangement of the second die in more detail. It should be appreciated that the arrangement of FIG. 5 is provided on the second die 204 and shows the first interfacing arrangement. The second interfacing arrangement may have a similar structure to the first interfacing arrangement.

In the arrangement shown in FIG. 5, the interfacing arrangement has an interface 156 and an address translation unit 152. The interface is arranged to communicate with the address translation unit 152. A communication path 140 is provided between the interface 156 and the address translation unit 152. The address translation unit 152 comprises translation store logic 142, content addressable memory 144 and a register bank controller 146. The address translation unit is configured to communicate with other entities via the network-on-chip 260. Blocks 244-254 represent other on-chip logic and may for example be targets or any other suitable logic.

The interface 156 when it receives a request packet from the first die, may copy the address part of the packet either to the translation store logic 142 of the address translation unit or in some embodiments to the controller 146. The interface 156 will make a decision as to where the address part of the packet is to be copied based on the state of the translation store enable signal which is referenced 158. This translation store enable signal is provided from the register bank controller 146 to the interface 156 when the content addressable memory has been populated with entries.

If the translation store enable signal is asserted then the packet address is copied to the translation store logic 142. Otherwise, the address is copied to the register bank controller for controlling the configuration of the CAM. The providing of a new address will be described in more detail later.

Figure 3:
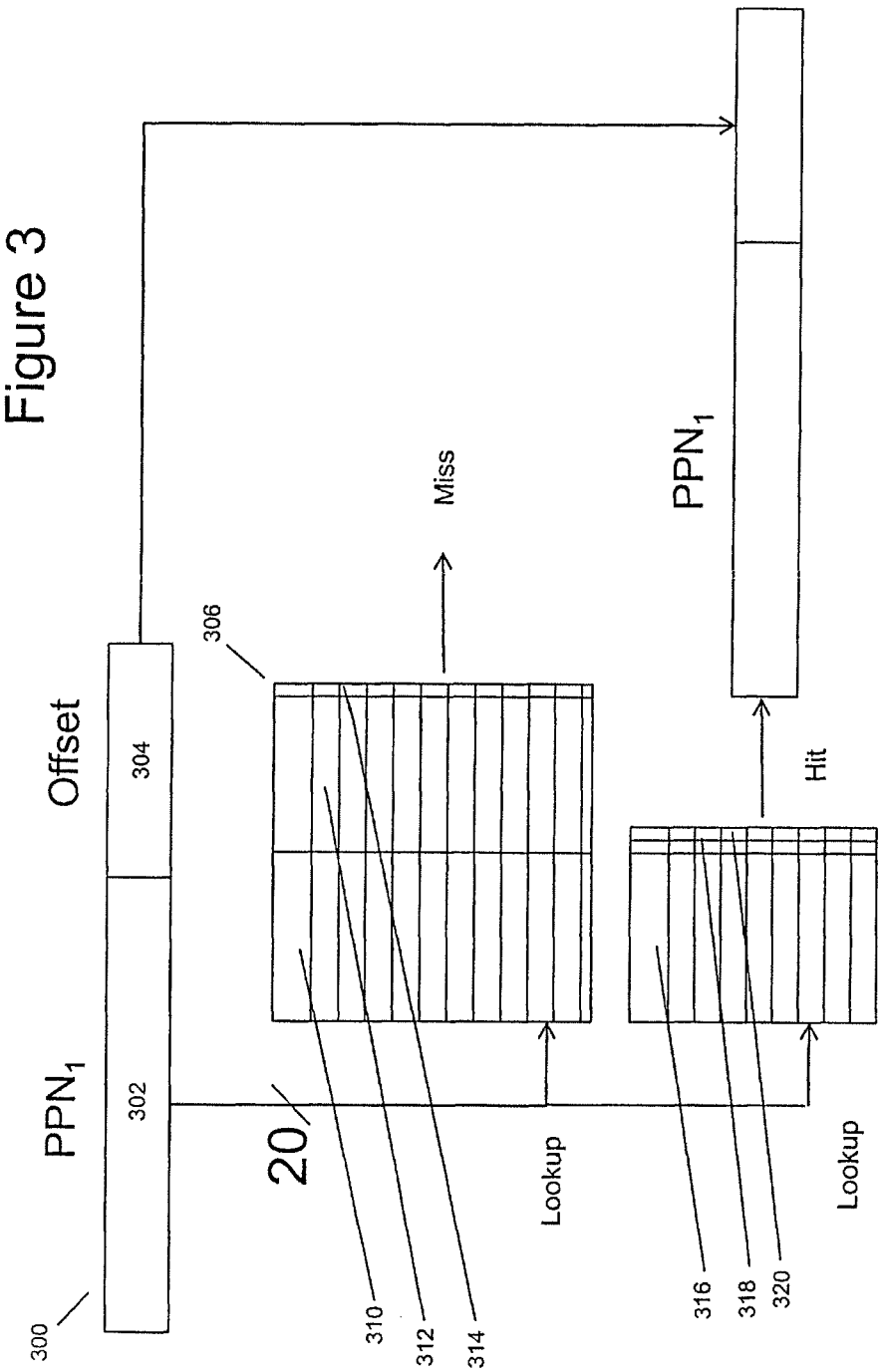
FIG. 3 schematically shows the blocks of the second die used for a remapping/routing function.

The translation store logic 142 is used when the translation store signal is enabled. The CAM 144 receives an input address, compares it to a list of addresses stored in the CAM. Reference is made to FIG. 3 which shows the address translation process carried out by the translation store logic and CAM 114 of the address translation unit. An incoming address 300 is received which has a physical page number PPN 302 and an offset 304. The physical page number is provided by the originator of the request and effectively can be regarded as being a virtual page number. The physical page number acts as a look-up to a first translation table 306 which may be provided by a first part 145a of the content addressable memory 144 as well as to a through routing table 308 which may also be provided by a second part of content addressable memory 144. In some embodiments, the look-up to both tables will take place at generally the same time. In some alternative embodiments, one table may be looked-up before the other. Separate content addressable memories may be provided for each table. In alternative embodiments, the look-up tables may be provided in the same memory.

The first look up table has, for each entry, the following information: an incoming physical page number 310 and a corresponding physical page number of the local die 312. It should be appreciated that in some embodiments, each entry of the look-up table may have one or more associated indications 314, for example if the entry is valid or not.

If the physical page number has an entry in the first look-up table 306, the corresponding physical page number for the second die is output. This is combined with the offset to define a physical address for the second die. In the example shown in FIG. 3, if the PPN does not have an entry in the first look-up table 306, then the output is a miss.

The through routing table is smaller than the translation store table for the second die. This is because the table only needs to include information identifying the die for which the transaction is requested. For each entry, there is an incoming physical page number 316 and an indication 318 if the address is associated with another die. This indication may indicate the another die or alternatively a further indication may be provided if there is more than one die and may have the identity of the further die. Accordingly, if the physical page number has an entry in the through routing table, the identity of the die to which the transaction is to be routed is determined from the table. The output of the through routing table will be a hit and the physical address will be the same as the incoming physical address made up of the PPN output via the look-up table and the offset which is added back to the address. Thus, as can be seen from FIG. 3, the incoming transaction address is not translated but instead is routed to the die for which the transaction is required.

In one embodiment, instead of identifying the die for which the transaction is required, the table may indicate the interfacing arrangement or the interface to which the request should be routed. It should be appreciated that this may be used where a die has more than one additional interfacing arrangement.

The through routing table again may have information regarding the validity, etc. of a particular entry.

Figure 4:
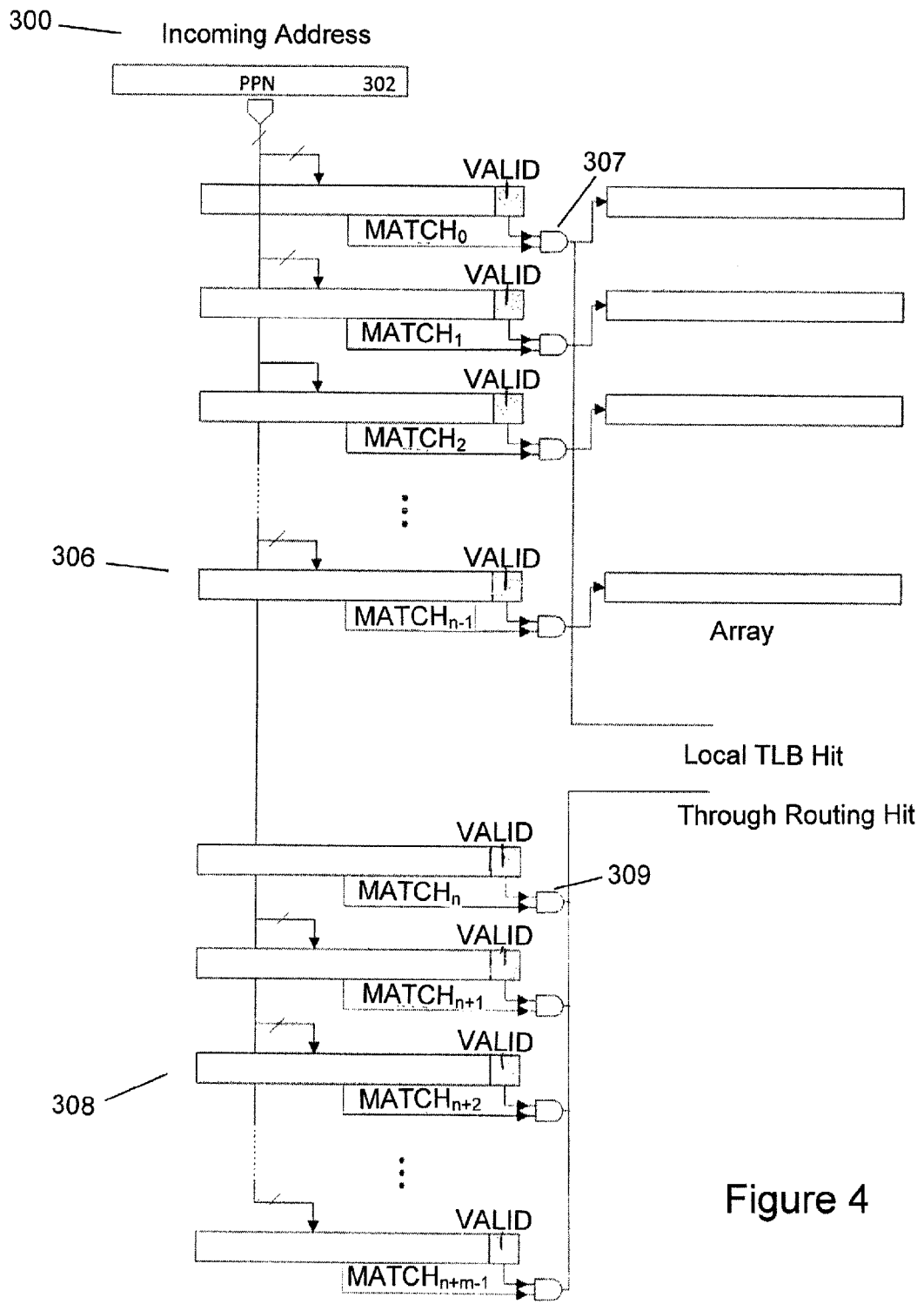
FIG. 4 shows a routing content addressable memory arrangement of FIG. 3 in more detail.

Reference is made to FIG. 4 which shows the process of FIG. 3 in more detail. The CAM comprises a ternary content addressable memory in which entry bits may be 1, 0 or X (don't care). The PPN 302 of the incoming address is presented to n TCAM registers (numbered 0:n−1) of the first table 306. The output of each register will provide an indication if there is a match between the PPN and the contents of the register. This may be indicated by single bit which may be 1. The match bit is gated by a respective AND gate 307 with a valid bit of register. A match is asserted if the entry of the register is valid and there is a match. Otherwise it is determined that there is no match with an address held in a particular register. This match indication is able to select a corresponding register which contains the upper bits of the translated address associated with the input address. The output of each of the n AND gates are OR-ed together to provide an indication if there has been a hit on any of the registers. This is provided on a Local translation store hit line.

Concurrently the PPN of the incoming address is presented to m TCAM registers (numbered n:n+m−1) of the second table. The output of each register will provide an indication if there is a match between the PPN and the contents of the register. This may be indicated by single bit which may be 1. The match bit is gated by a respective AND gate 309 with a valid bit of register. A match is asserted if the entry of the register is valid and there is a match. Otherwise it is determined that there is no match with an address held in a particular register. The output of each of the m AND gates are OR-ed together to provide an indication if there has been a hit on any of the registers. This is provided on a Through Routing Hit line.

A properly configured translation store means that precisely one of the valid TCAM comparators will assert a match and therefore exactly one of the Local translation store hit line or Through Routing Hit line will be asserted.

The interface will interpret an asserted Through Routing Hit line to mean that the packet is forward to another interfacing arrangement. The interface will also interpret an asserted Local translation store hit line together with a translated address to indicate that the incoming packet should be routed on the local on-chip interconnect with the translated address used for subsequent routing.

The on chip interconnect sends the packet to the other interfacing arrangement based on the result field of the through routing table, and not on the address field within the packet. The address is only valid once it has hit (and been translated or not) within the local remapping translation store. In embodiments, there is different routing for the transactions which are intended for the die and the transactions which are to be passed to a further die. This may be provided by a different physical path or separate channels which may be virtual.

In some embodiments, the translation store may be a translation look aside buffer or similar.

The address of the transactions is a physical address.

The interfaces may be provided adjacent a die boundary.

The transaction may be a memory transaction. Alternatively, the transaction may be another type of transaction.

In the embodiments shown, each die is shown as having a network on chip. In some embodiments, one or more dies may have alternatively or additionally a bus arrangement or any other suitable communication links.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:
1. An arrangement comprising:
  a first interface configured to receive a memory transaction having an address from a second arrangement;
  a second interface;

an address translator configured to determine, based on said address, if said transaction is for said first arrangement and if so to translate said address or if said transaction is for a third arrangement to forward said transaction without modification to said address to said second interface, said second interface being configured to transmit said transaction, without modification to said address, to said third arrangement;

wherein said address translator comprises a first table with each entry comprising a first address and a second translated address corresponding to the first address, and a second table with each entry comprising a first address and an indication if said transaction is to be forwarded without modification to said address.

2. An arrangement as claimed in claim 1, wherein said second address comprises a translated physical page number.

3. An arrangement as claimed in claim 1, wherein said indication comprises destination information.

4. An arrangement as claimed in claim 1, wherein said first address comprises at least part of said address of said transaction.

5. An arrangement as claimed in claim 1, wherein said first address comprises a physical page number of said address of said transaction.

6. An arrangement as claimed in claim 1, wherein said translator is configured to provide first information if there is a match in said first table and second information if there is a match in the second table.

7. An arrangement as claimed in claim 6, wherein said interface is configured to use said first information to route said transaction with said translated address.

8. An arrangement as claimed in claim 6, wherein said interface is configured to use said second information to route said transaction without modification to said address.

9. An arrangement as claimed in claim 1, wherein said interface is configured to present said at least a part of said first address to said first table and said second table at substantially the same time.

10. An arrangement as claimed in claim 1, wherein said first and second table are configured such that only a single match in one of said first and second tables can be made.

11. An arrangement as claimed in claim 1, wherein at least one of said first and second tables are provided by content addressable memory.

12. An arrangement as claimed in claim 11, wherein each entry is provided by a at least one register.

13. An arrangement as claimed in claim 12, wherein said translator is configured such that when there is a match of an entry in a register of said first table to at least a part of said address of said transaction, a match indication is provided.

14. An arrangement as claimed in claim 13, wherein said translator is configured responsive to a match indication in said first table to select a corresponding register containing said second translated address.

15. An arrangement as claimed in claim 1, wherein said first and second interfaces are coupled to one another, bypassing an interconnect provided on said first arrangement.

16. A method comprising:
receiving at a first integrated circuit die a memory transaction having an address from a second integrated circuit die;
determining, by the first integrated circuit die and based on said address, if said transaction is for said first integrated circuit die and, if so, translating said address or if said transaction is for a third integrated circuit die transmitting said transaction, without modification to said address, to the third integrated circuit die;

wherein the translation is based upon a first table with each entry comprising a first address and a second translated address corresponding to the first address, and second table with each entry comprising a first address and an indication if said transaction is to be forwarded without modification to said address.

17. A method as claimed in claim 16, wherein said second address comprises a translated physical page number.

18. A method as claimed in claim 16, wherein said indication comprises destination information.

19. A method as claimed in claim 16, wherein said first address comprises at least part of said address of said transaction.

20. A method as claimed in claim 19, comprising presenting said at least a part of said first address to said first table and said second table at substantially the same time.

21. A method as claimed in claim 16, wherein said first address comprises a physical page number of said address of said transaction.

22. A method as claimed in claim 16, wherein said translating comprises providing first information if there is a match in said first table and second information if there is a match in the second table.

23. A method as claimed in claim 22, comprising said first information to route said transaction with said translated address.

24. A method as claimed in claim 22, comprising using said second information to route said transaction without modification to said address.

25. A method as claimed in claim 16, wherein said first and second table are such that only a single match in one of said first and second tables can be made.

26. A method as claimed in claim 16, comprising providing a match indication when there is a match of an entry in a register of said first table to at least a part of said address of said transaction.

27. A method as claimed in claim 26, responsive to a match indication in said first table selecting a corresponding register containing said second translated address.

28. A system comprising:
a package; and
a plurality of integrated circuit dies carried by said package;
a first integrated circuit die from among said plurality thereof comprising
a first interface configured to receive a memory transaction having an address from a second integrated circuit die from among said plurality thereof,
a second interface, and
an address translator configured to determine, based on the address, if the memory transaction is for the first integrated circuit die and if so to translate the address, or if the memory transaction is for a third integrated circuit die from among said plurality thereof and if so to forward the memory transaction without modification to the address to said second interface,
said second interface being configured to transmit the memory transaction, without modification to the address, to said third integrated circuit die,
wherein said address translator comprises a first table with each entry comprising a first address and a second translated address corresponding to the first address, and a second table with each entry comprising a first address and an indication if the memory transaction is to be forwarded without modification to the address.

29. The system of claim 28 wherein the second address comprises a translated physical page number.

30. The system of claim 28 wherein the indication comprises destination information.

31. The system of claim 28 wherein the first address comprises at least part of the address of the memory transaction.

32. The system of claim 28 wherein the first address comprises a physical page number of the address of the memory transaction.

* * * * *